United States Patent [19]

Stever et al.

[11] 4,194,690

[45] Mar. 25, 1980

[54] BUG-BOPPER

[76] Inventors: Carole A. Stever; Robert L. Stever, both of Nine Ledum Run, West Grove, Pa. 19390

[21] Appl. No.: 899,816

[22] Filed: Apr. 25, 1978

[51] Int. Cl.² .................................................. A61L 9/04
[52] U.S. Cl. ...................................... 239/57; 43/131; 47/48.5; 239/59
[58] Field of Search .................................. 239/53–60; 43/121, 125, 129, 131, 132 R; 47/48.5

[56] References Cited

U.S. PATENT DOCUMENTS

| | | | |
|---|---|---|---|
| 1,729,389 | 9/1929 | Hughett | 43/131 |
| 2,251,058 | 7/1941 | Kirkman | 43/129 |
| 2,765,194 | 10/1956 | Will | 239/59 |
| 3,108,391 | 10/1963 | Sipos | 43/131 |

FOREIGN PATENT DOCUMENTS

| | | | |
|---|---|---|---|
| 2639494 | 3/1978 | Fed. Rep. of Germany | 43/131 |
| 835668 | 5/1960 | United Kingdom | 239/58 |

*Primary Examiner*—Robert B. Reeves
*Assistant Examiner*—Michael J. Forman
*Attorney, Agent, or Firm*—Stanley B. Kita

[57] ABSTRACT

A device for controlling pests on house plants comprises a convex cap having a chamber containing a pesticide, a stem for supporting the cap adjacent a plant, and a removeable closure for the chamber to afford air flow through the chamber to distribute the pesticide about the plant.

5 Claims, 6 Drawing Figures

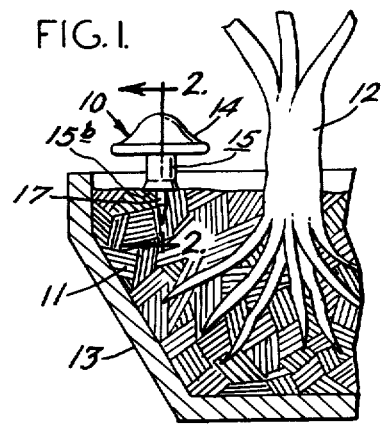
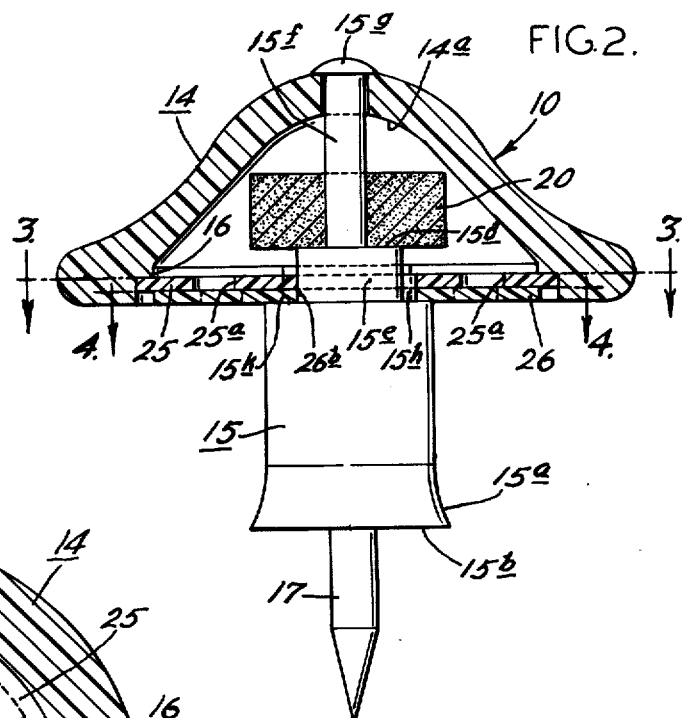
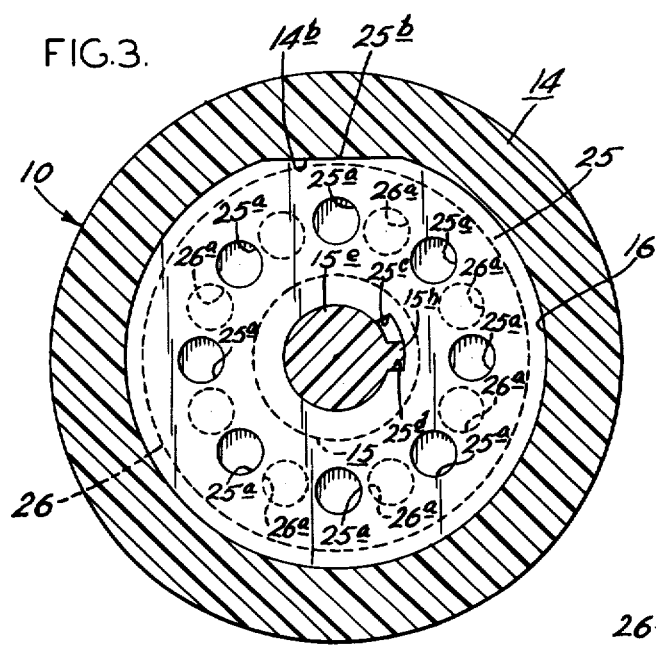
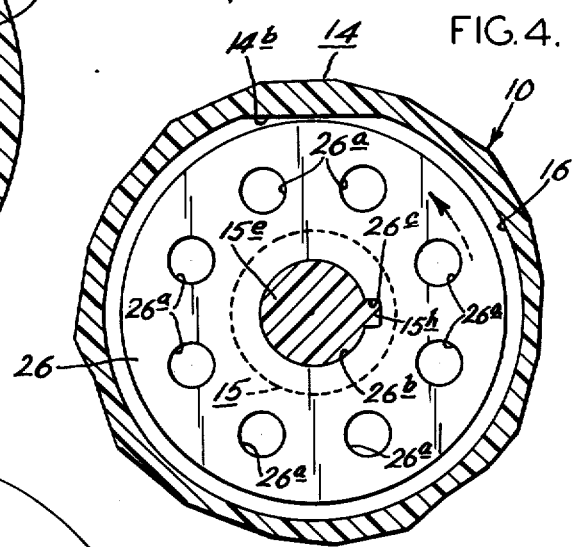
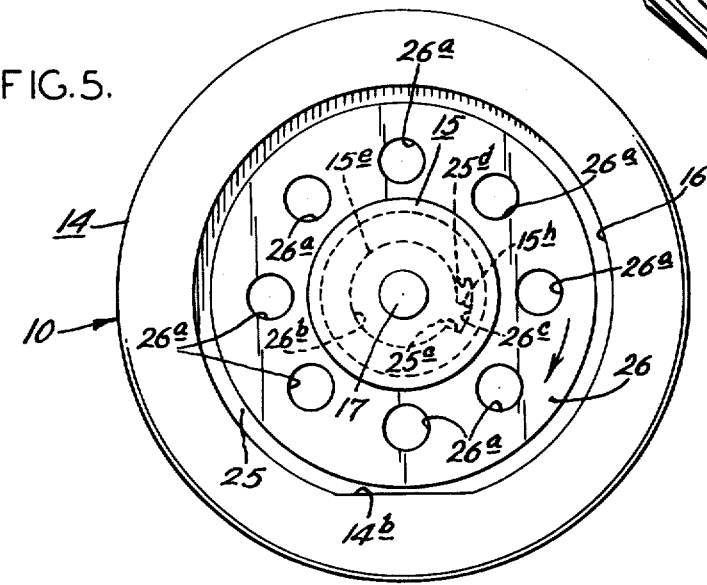
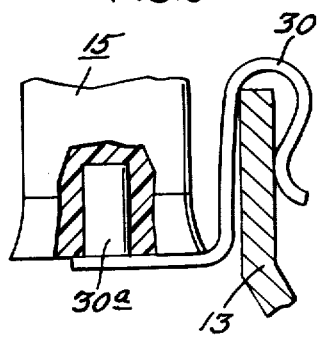

BUG-BOPPER

Reference is hereby made to Disclosure Document No. 60847 filed on May 18, 1977.

FIELD OF THE INVENTION

The present invention relates to plant pesticide disspensers, and more particularly, the present invention relates to dispensers specifically designed to be used in controlling pests associated with house plants.

BACKGROUND OF THE INVENTION

It is known that from time to time house plants can become infested with pests which feed on the plant and which, is not controlled, can weaken or even kill the plant. Pesticides are known for controlling such pests; however, at present, such pesticides are usually applied by spraying the plant. The disadvantage of spraying resides in the tendency for the pesticide to be washed from the leaves, stems, etc. of the plant when the plant is watered and/or misted. Furthermore, spraying must be done periodically to be effective, and there exists the danger of children consuming the pesticides, not to mention the mess involved in mixing the sprays, cleaning the applicators, etc. Thus, there is an ever-present demand for an effective yet safe pesticide dispenser.

OBJECTS OF THE INVENTION

With the foregoing in mind, a primary object of the present invention is to provide a novel pesticide dispenser which is particularly suited for controlling pests of the type which afflict house plants.

It is another object of the present invention to provide a decorative pesticide dispenser which functions continuously to dispense pesticide.

Another object of the present invention is to provide a relatively simple and inexpensive pesticide dispenser which can be manufactured economically of molded-plastic parts.

As a further object, the present invention provides an improved pesticide dispenser which is safe to use even in homes where young children live.

Yet another object of the present invention is to provide a pesticide dispenser which is normally sealed until ready to be used and which is designed to be activated without any special tools or complicated instructions.

SUMMARY OF THE INVENTION

As a more specific object, the present invention provides a device for use in controlling pests on growing plants. The device comprises a convex cap having a chamber with an open bottom, a stem for mounting the cap above the soil adjacent a plant to be treated, a pesticide disc contained in the chamber, and removeable means extending across the bottom of the chamber to afford the flow of ambient air through the chamber for mixing with vapors emitted by the pesticide disc. The cap shields the pesticide from water during watering of the plant, and the stem properly spaces the cap from the soil to ensure air flow about the pesticide. Preferably, the removeable means includes a pair of juxtaposed apertured discs extending across the bottom of the chamber and operable upon rotation of the cap relative to the stem to cause their apertures to register for communicating the pesticide vapor in the cavity with amient air.

BRIEF DESCRIPTION OF THE DRAWINGS

The foregoing and other objects, features and advantages of the present invention should become apparent from the following description when read in conjunction with the accompanying drawings, in which:

FIG. 1 is a thumbnail view of a potted house plant with which is associated a pesticide dispenser embodying the present invention;

FIG. 2 is an enlarged view in partial section taken on line 2—2 of FIG. 1;

FIG. 3 is a transverse sectional view taken on line 3—3 of FIG. 2 to illustrate the dispenser in its inactive state;

FIG. 4 is a sectional view taken on line 4—4 of FIG. 2; and

FIG. 5 is an inverted plan view of the device illustrated in FIG. 2, but shown in the activated position.

FIG. 6 is a fragmentary view of the pesticide dispenser illustrating a modified means for mounting the device adjacent a plant.

DESCRIPTION OF THE PREFERRED EMBODIMENT

Referring now to the drawings, FIG. 1 illustrates a pesticide dispenser 10 which embodies the present invention. The dispenser 10 is shown mounted in the soil 11 which supports a plant 12 in a pot or container 13. As will be discussed hereinafter, the dispenser could be provided with others means for securing the dispenser 10 in proximity with a potted plant.

Referring now to FIG. 2, the dispenser 10 comprises a convex cap or housing 14 providing a chamber 14a having an open bottom 16. In the illustrated embodiment, the cap 14 has a downwardly and outwardly sloping generally frust-conical shape which is mounted atop a cylindrical stem 15 to provide a decorative mushroom-like appearance. The stem 15 has an outwardly-flared portion 15a terminating in a lower shoulder 15b adapted to engage the top of the soil 11 in the manner illustrated in FIG. 1. A pointed tip 17 depends below the lower stem shoulder 15b and is designed to penetrate the soil for mounting the stem 15 upright in the manner illustrated. Preferably, the tip 17 is press-fit or screwed upwardly into a longitudinal hole in the stem 15 so as to be removeable in the event that the consumer may wish simply to place the stem on a flat surface (such as a shelf) adjacent the plant. If desired, a spring-like clip 30 (FIG. 6) may be provided in lieu of the tip 17 to mount the stem 15 onto the upper edge of a pot. In such case, the clip 30 has a finger 30a which pushes or screws upwardly into the hole in the stem 15. Desirably, the device 10 is packaged with both the tip 17 and clip 30 so that the consumer has several mounting options.

A pesticide is contained in the cap chamber 14a. In the present instance, the pesticide is in the form of a toroid or disc 20 which is spaced upwardly from the bottom of the chamber 14a. Preferably, the pesticide disc 20 is mounted on an upper shoulder 15d provided on the top of a necked-down portion 15e of the stem 15 and is secured thereon by a pin 15f projecting upwardly through a hole in the center of the disc 20. The pin 15f projects upwardly through an aperture in the center of the cap 14, and the cap 14 is secured to the stem 15 by heat peening the head 15g of the plastic pin 15f in the manner illustrated. Thus, the pellet 20 is protected by the concave cap 14 against erosion when the plant is being watered, and the structure of the stem 15 ensures proper spacing of the disc 20 from the soil. Furthermore, the shape of the cap 14 and stem 15 provide a mushroom-like appearance which is decorative in addition to being utilitarian.

The pesticide disc 20 is sealed within the chamber 14a until ready for use. To this end, removeable means is provided to close the bottom of the chamber 14a. In the illustrated embodiment, the removeable means includes an upper or first flat circular closure member or disc 25 having a series of circular apertures 25a spaced apart therein and a second or lower flat circular closure member or disc 26 juxtaposed below the first disc 25 and having a like series of apertures 26a. The upper closure disc 25 is mounted to the cap 14 and has a flat 25b engaging a like flat 14b on the cap 14 so that the cap 14 and closure disc 25 can move in unison. The lower closure disc 26 has a central hole 26b with a recess 26c engaging a key 15h on the stem 15 so that the stem 15 and lower closure disc 26 move in unison. The closure discs 25 and 26 are both seated on an intermediate shoulder 15k of the stem 15. It is noted that the upper closure disc 25 has a slot providing stops 25c and 25d which engage opposite sides of the stem key 15h to limit rotary movement of the cap 14 relative to the stem 15.

The dispenser 10 is packaged with the pesticide disc chamber 15 normally sealed in an inactivated condition by virtue of the holes 25a in the upper closure member 25 being offset from the holes 26a in the lower closure member 26 as illustrated in FIG. 3. Thus, air is prevented from circulating around the disc. To activate the dispenser, however, the stem 15 is simply rotated relative to the cap in the direction of the arrow in FIG. 5 until the key 15h engages the stop 25c, at which point the holes 25a and 26a register with one another to afford the flow of air into the chamber 15 for mixing with pesticide vapors emitted by the pesticide disc 20. The device 10 is then inserted in the soil 11 adjacent the plant 12 in the manner illustrated in FIG. 1 or hooked onto the plant pot 13 as shown in FIG. 6.

The device 10 is economical to manufacture. This is because all the components are fabricated of injection molded plastic. Assembly is simple because the lower closure disc 26 is simply pushed downwardly onto the stem with the key 15h engaging in its recess 26c. Thereafter, the upper closure disc 25 is juxtaposed on the lower one 26. The pesticide pellet 20 is then placed on the pin 15f, and the cap 14 is mounted on the pin 15f with its flat 14b engaged with the corresponding flat 25b on the upper closure disc 25. The pin 15f is thereafter peened at 15o by the application of heat and pressure axially downward. Thus, the cap 14 cannot readily be removed from the stem, and the pesticide pellet is protected from access by children.

Although various types of pesticides may be utilized, one form is of the type which has been marketed by Shell Oil Co. under trade designation "No Pest Strip." Other forms of pesticides include miticides contained within suspension gels. Pesticides such as Diazinon, Malathane and Malathion in suspension gels may be utilized effectively. Also, BLACK LEAF WOODY could be combined with a suspension gel and used in this device to control plant scale. Desirable pesticides are characterized by their tendency to vaporize and mix with ambient air which mixture circulates about the plant in response to normal air currents in a house. The type of pesticide placed in the chamber may vary, depending on the particular type of pest to be controlled.

In the illustrated embodiment, the cap 14 has a mushroom-like configuration. It is contemplated, however, that the cap 14 may be molded into the shape of a bug, such as a large Lady-bug, and the mounting means may include depending leg-like clips affording attachment of the bug-like cap directly onto the plant stems. Even though the shape of the cap and the mounting means may, therefore, be different from that specifically illustrated, the relatively rotatable closure discs at the bottom of the cap are preferably employed to seal the chamber until placed in use.

In view of the foregoing, it should be apparent that the present invention now provides a novel pesticide dispenser which is attractive in appearance, safe in use, and economical to manufacture. Thus, while a preferred embodiment of the present invention has been described in detail, various modifications, alterations and changes may be made without departing from the spirit and scope of the present invention as defined in the appended claims.

We claim:

1. A device for use in controlling pests on a growing plant, comprising:

a cap having an interior chamber with an open bottom, a torroid of pesticide disposed in said chamber, first and second apertured closure members disposed across the bottom of said cap with said first closure member superimposed on said second and each having apertures adapted to register with one another upon relative rotation, a stem for supporting said cap on a surface adjacent said plant with said open bottom spaced from said surface, said stem having an upper shoulder in said chamber supporting said toroid and a pin projecting upwardly through said toroid and being upset downwardly toward said cap for rotatably mounting said cap to said stem, said stem also having a lower shoulder engaging the underside of said second closure member, means securing said first closure member to said cap for rotation therewith, and means securing said second closure member to said stem so that rotation of said cap relative to said stem causes the apertures in said closure members to register, thereby affording access of ambient air to said chamber for contacting said pesticide subsequently to distribute it about the plant.

2. A device according to claim 1 wherein said first closure member securing means includes engaged flats on said cap and said first closure member, and said second closure member securing means includes a key projecting upwardly from said intermediate shoulder and through said second closure member.

3. A device according to claim 2 including stop means on said first closure member for cooperating with said key to stop relative movement of said closure members when their apertures are aligned with one another.

4. A device according to claim 3 wherein said stem has a lower shoulder adapted to engage said surface and a tip portion depending below said lower shoulder for penetrating the surface to mount the stem upright.

5. A device according to claim 3 wherein said stem has a lower shoulder, and including a clip adapted to hook over the edge of a plant pot, and means connecting said clip to said stem shoulder.

* * * * *